(12) United States Patent
Klimentiev et al.

(10) Patent No.: US 8,117,317 B2
(45) Date of Patent: Feb. 14, 2012

(54) SYSTEMS AND METHODS FOR INTEGRATING LOCAL SYSTEMS WITH CLOUD COMPUTING RESOURCES

(75) Inventors: Michael Klimentiev, Belmont, CA (US); Bryan Gesicki, San Jose, CA (US); Asen Petrov, Mountain View, CA (US); Frank Stienhans, San Carlos, CA (US)

(73) Assignee: SAP AG, Walldorf (DE)

( * ) Notice: Subject to any disclaimer, the term of this patent is extended or adjusted under 35 U.S.C. 154(b) by 413 days.

(21) Appl. No.: 12/347,754

(22) Filed: Dec. 31, 2008

(65) Prior Publication Data

US 2010/0169497 A1 Jul. 1, 2010

(51) Int. Cl.
*G06F 15/16* (2006.01)
(52) U.S. Cl. ........................................... 709/227
(58) Field of Classification Search ........... 709/217, 709/223, 225, 228, 227
See application file for complete search history.

(56) References Cited

U.S. PATENT DOCUMENTS

| | | | | |
|---|---|---|---|---|
| 7,529,207 B2 * | 5/2009 | Jagana et al. | | 370/331 |
| 2003/0051021 A1 * | 3/2003 | Hirschfeld et al. | | 709/223 |
| 2004/0243650 A1 * | 12/2004 | McCrory et al. | | 707/203 |
| 2006/0107108 A1 * | 5/2006 | Geng et al. | | 714/11 |
| 2007/0233810 A1 * | 10/2007 | Brownell et al. | | 709/218 |
| 2008/0140786 A1 * | 6/2008 | Tran | | 709/206 |
| 2008/0295094 A1 * | 11/2008 | Korupolu et al. | | 718/1 |
| 2009/0185537 A1 * | 7/2009 | Jagana et al. | | 370/331 |
| 2009/0300151 A1 * | 12/2009 | Friedman et al. | | 709/222 |
| 2009/0300641 A1 * | 12/2009 | Friedman et al. | | 718/104 |
| 2010/0027552 A1 * | 2/2010 | Hill | | 370/401 |
| 2010/0154045 A1 * | 6/2010 | Pairault et al. | | 726/8 |

OTHER PUBLICATIONS

Amazon Web Services (TM) "Amazon Elastic Compute Cloud", Developer Guide, API Version Aug. 8, 2008.

\* cited by examiner

*Primary Examiner* — Moustafa M Meky
*Assistant Examiner* — Sargon Nano
(74) *Attorney, Agent, or Firm* — Fountainhead Law Group P.C.

(57) ABSTRACT

In one embodiment the present invention includes systems and methods for integrating local systems with cloud computing resources. In one embodiment, shared security information is stored on a local system and on a cloud computer system to allow secure communications between software applications on the two systems. In another embodiment, a tunnel agent client on a local system and a tunnel agent server on a cloud computer system are used to establish a secure connection point between the two systems.

14 Claims, 11 Drawing Sheets

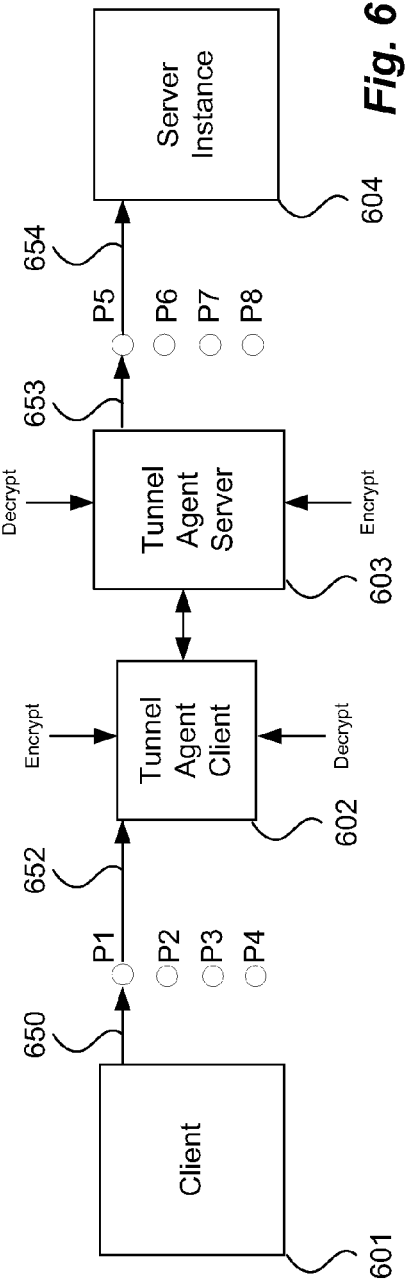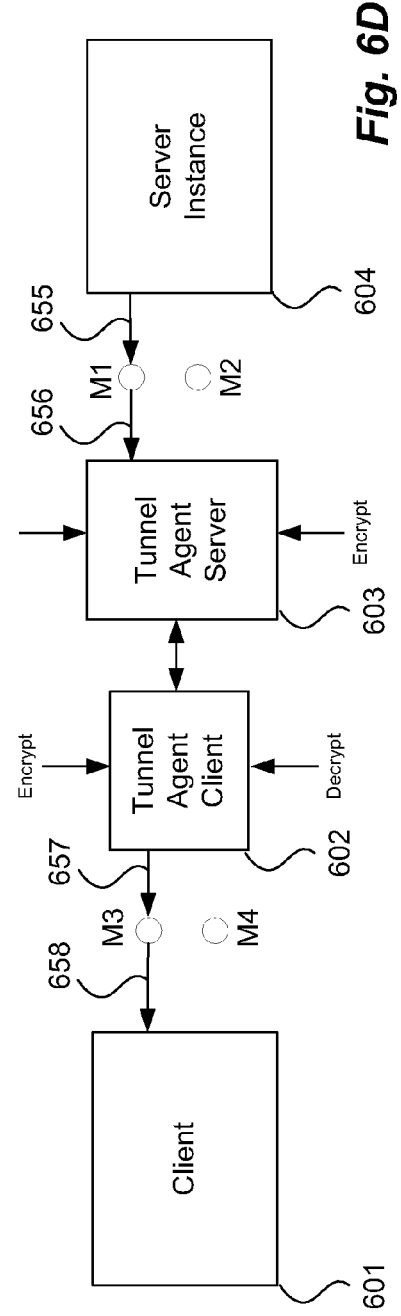

SYSTEMS AND METHODS FOR INTEGRATING LOCAL SYSTEMS WITH CLOUD COMPUTING RESOURCES

BACKGROUND

The present invention relates to computing, and in particular, to systems and methods of integrating local systems with cloud computing resources.

In general, the concepts of "virtual" and "cloud computing" includes the utilization of a set of shared computing resources (e.g., servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

A variety of different computing resources may be created on a cloud. For example, a resource may include all the information necessary to run application software, and may include UNIX, Linux, or Windows operating systems and specific application software as desired by a user. The information for configuring the resource to be created is referred to as an image. After an image has been created (instantiated), the resource becomes an instance (a server instance).

FIG. 1 illustrates a typical cloud computing architecture. A service requester 104 may desire to use computing resources available on the cloud 102. As mentioned above, physically, the cloud may be one or more physical computer networks (e.g., server farms) accessible over the Internet, for example, with software for creating resource images and instances desired by users. One such cloud computing system is offered by Amazon.com®. Before a cloud computing resource can be created and used, a user must typically configure the particular resource. For example, in the case of a virtual server or virtual appliance, a user must configure the server or appliance and provision a physical server to execute the virtual server or appliance. Service requestor 104 may send messages to a cloud management system 103 to create or access configuration information for creating resources on cloud 102. In response to such messages, cloud management system 103 may configure a virtual server or virtual appliance for use by a requesting user. As illustrated in FIG. 1, the cloud management system 103 may act as an interface, whereby one or more users may setup resources on the cloud. For example, cloud management system 103 may facilitate web-based access to various administrative functions thereby enabling the user to configure the cloud-based resource using a conventional web browser application. For instance, the management system 103 may display to the user a list of resources or services that the user can utilize, along with a list of commands (e.g., start, stop, suspend, list) that can be executed to operate on, or with, certain resources. As mentioned above, the cloud-based resources may comprise, for example, a list of preconfigured or customized machine images corresponding to virtual servers that can be instantiated in the cloud. The management systems may manage the available resources, including the physical servers.

As illustrated in FIG. 1, cloud management system 103 may use configuration data 105 for setting up computing resources for different users. The configuration data may specify the details of the computing resources to be allocated, such as the image to be instantiated and the amount of computing resources to be applied. For instance, a user may upload a customized machine image or select a pre-configured machine image. The management system may store configuration data 105 in a repository, for example. When the user desires to use the resources, the system may generate the necessary commands for instantiating the virtual server on the appropriate physical server. For example, if a user desires a small amount of resources, the user may direct management system 103 to access configuration data specifying an image including a virtual CPU having a certain processing power and specifications, 1 GB of memory, and 100 GB of persistent storage. However, if the user desires a large amount of resources, the user may direct management system 103 to access configuration data specifying an image including multiple virtual CPUs having a certain processing power, 10 GB of memory, and 500 GB of persistent storage. The images are used to create server instances of the specified resources. Once the resources are instantiated, a link to the resources is sent to the user (e.g., an IP address) and the user may access the resources to run software applications as desired.

One problem associated with cloud computing system is security. In some situations, it may be desirable for software systems running on a local network inside a company to interface with resources running on a cloud. FIG. 2 illustrates an existing technique for creating a secure connection between a local system 200A and a cloud computing system 200B over a network 255. In this example, a local system 200A may include a client 201 and one or more backend systems 207 and 208 (e.g., a software server executing on a computer system). The client system may be a software application that communicates with software running on the backend systems 207 and 208. For example, the client may be a software application executing on a computer system, such as Netweaver Design Studio by SAP AG®, for example, and the backend systems may be an Enterprise Resource Planning ("ERP") software server system or Customer Relationship Management ("CRM") software server system, for example. If the computing resources of the local system become insufficient, client 201 may send a request for additional software resources across a network 255 (e.g., the Internet) to cloud management service 202 on cloud 200B. Cloud management service 202 may access configuration data 203 to create server instances 204 to meet the computing demands of the local network. However, since the new resources are on the cloud, access to the new resources, and communication between the new resources on the cloud and the local system, must be made secure. Additionally, the communications must be authorized to penetrate a local firewall 250 and a firewall 251 protecting the cloud, for example. One existing approach to provide this security is to use a virtual private network ("VPN"). In this example, a VPN 205 node may be implemented on cloud computing system 200B. Another VPN 206 node may also be implemented on the local system 200A. The VPN implementations may enable secure communication between client 201 and server instances 204.

There are a number of problems with the existing tools and techniques for integrating a local system with external resources in a computing cloud. First, conventional cloud management systems provide no easy way to achieve a tight secure integration between clients and servers on a local system and software instances on a cloud. In particular, implementing secure communications through a VPN creates a bottleneck in the VPN. Additionally, complex and sometimes incompatible third party VPN software interfaces and requirements must be integrated into the local networks and cloud instances. Moreover, VPNs do not provide the flexibility and feature set desired fully integrate a local system with a cloud in a dynamic manner. For instance, VPNs are typically used for static networks, and are not suited for a changing environment where new resources are created and integrated into a local network on-the-fly. Consequently, there exists a need for improved systems and methods for integrating external resources with a local system.

SUMMARY

In one embodiment the present invention includes systems and methods for integrating local systems with cloud computing resources. In one embodiment, shared security information is stored on a local system and on a cloud computer system to allow secure communications between software applications on the two systems. In another embodiment, a tunnel agent client on a local system and a tunnel agent server on a cloud computer system are used to establish a secure connection point between the two systems.

The following detailed description and accompanying drawings provide a better understanding of the nature and advantages of the present invention.

BRIEF DESCRIPTION OF THE DRAWINGS

FIGS. 6A-D illustrate communications between local resources and cloud resources according to one embodiment of the present invention.

DETAILED DESCRIPTION

Described herein are techniques for integrating local systems with cloud computing resources. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
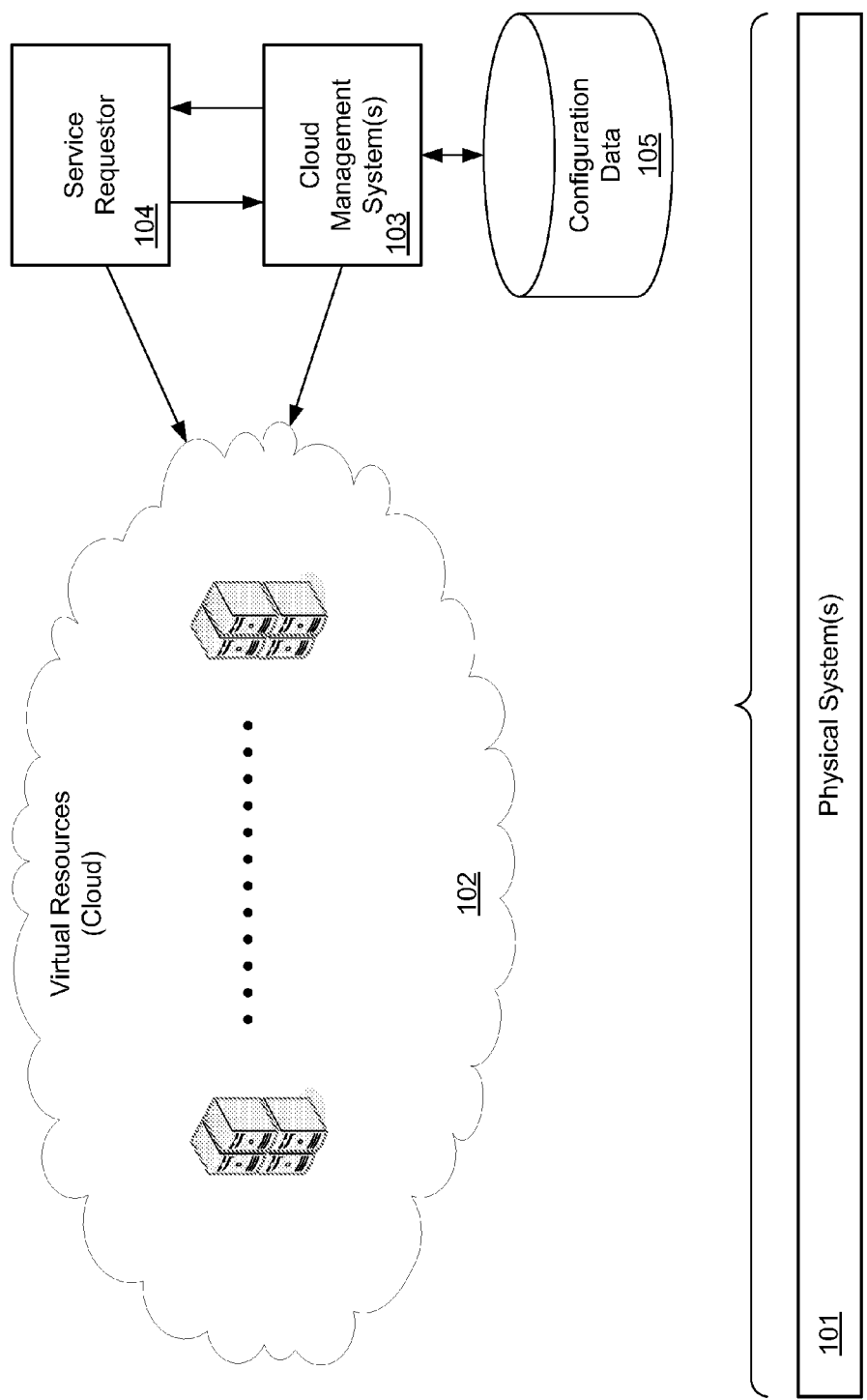
FIG. 1 illustrates an example cloud computing architecture.
Figure 2:
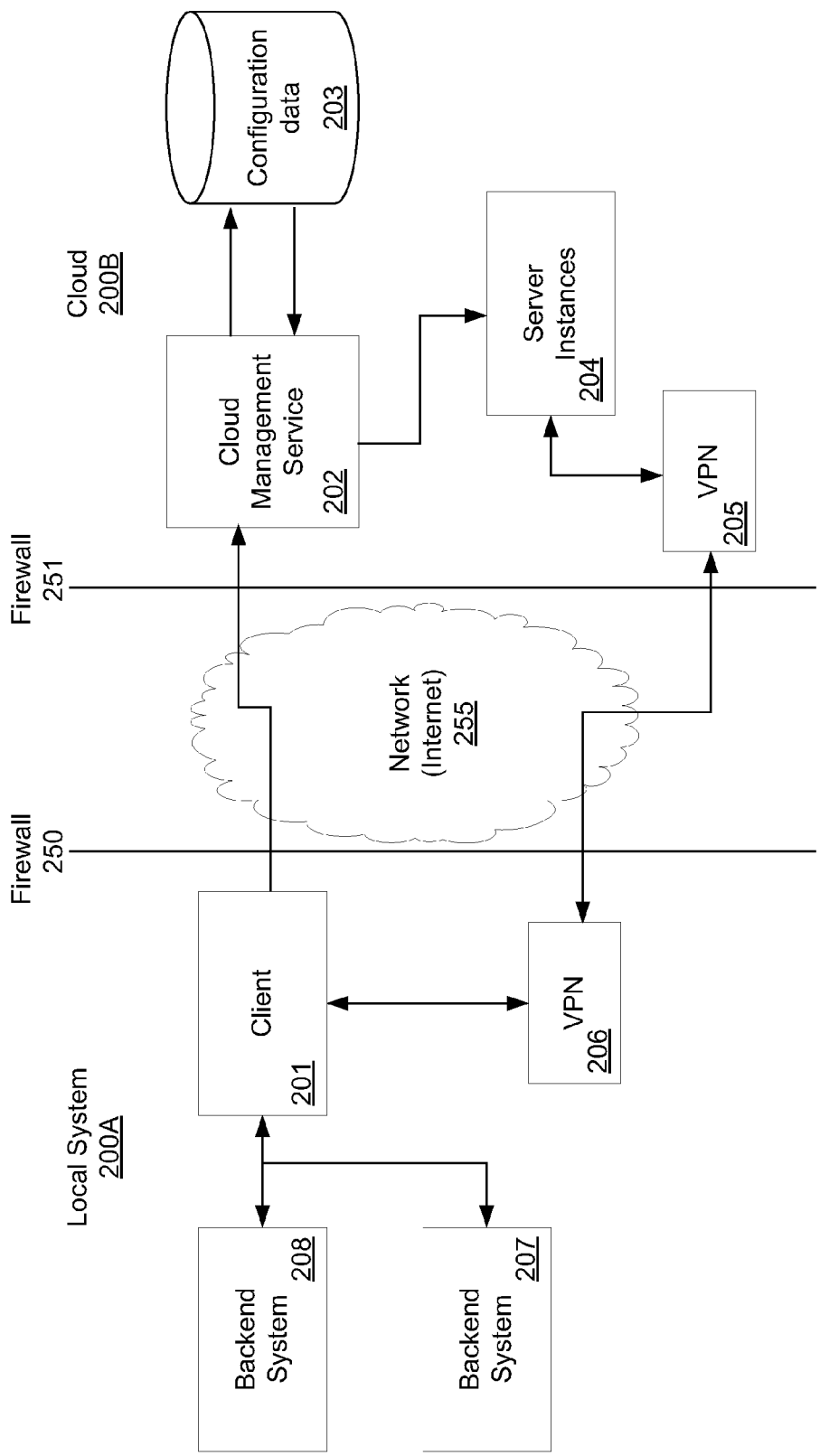
FIG. 2 illustrates an existing technique for creating a secure connection between a local system and a cloud computing system.
Figure 3:
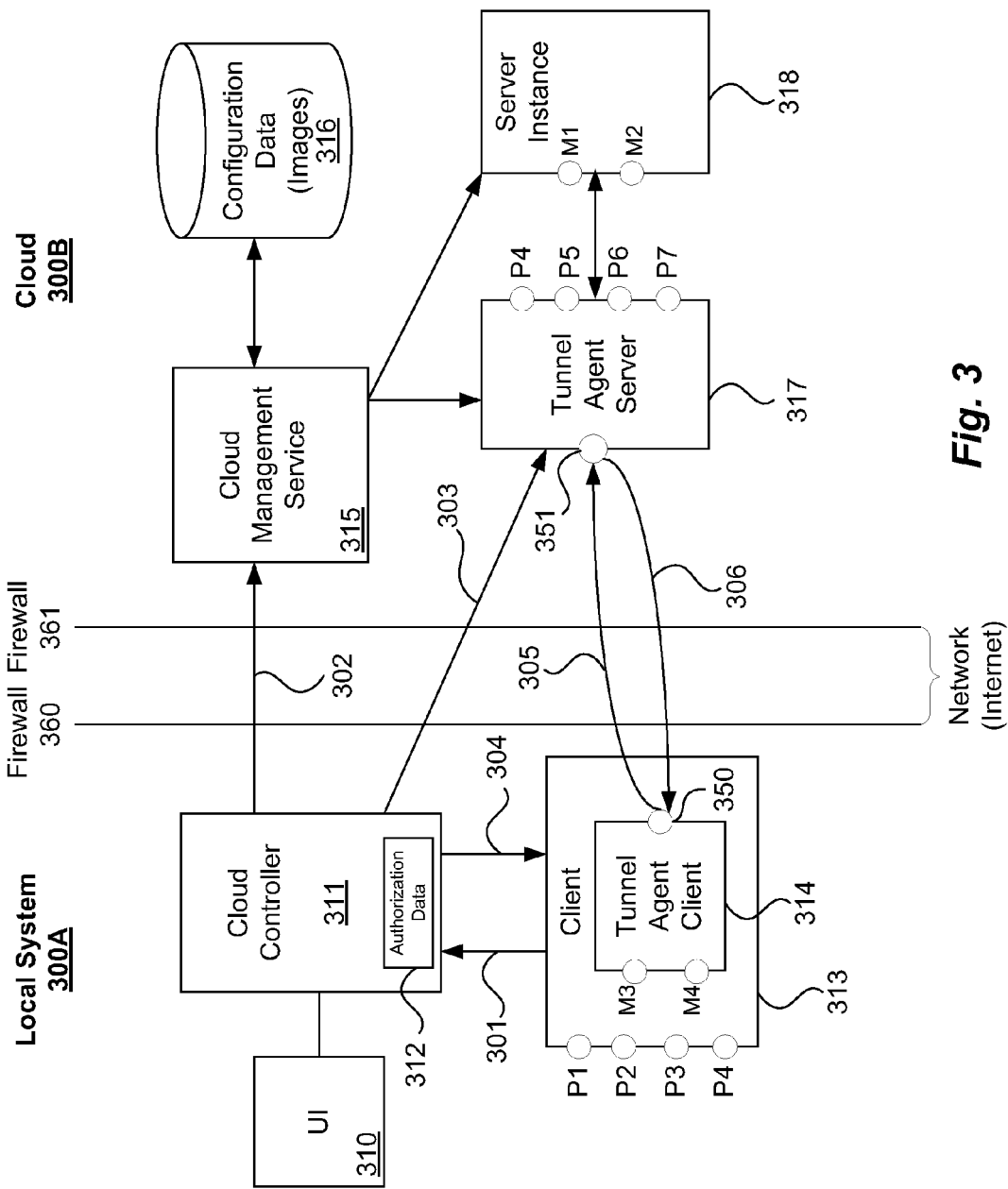
FIG. 3 illustrates integrating external resources with a local system according to one embodiment of the present invention.

FIG. 3 illustrates secure integration of external resources with a local system according to one embodiment of the present invention. A local system 300A may include a client 313 that is running software, such as a software application (e.g., Netweaver Design Studio by SAP AG®), for example. The client software program may be loaded and executed on a computer system, such as a laptop or desk top computer, for example. If a user of client 313 desires additional computing resources, the user may trigger a request to across a network, such as the Internet, to a cloud computing system 300B for such resources. For example, embodiments of the present invention include a cloud controller software component 311 for creating secure connections to new resources on a cloud computing system 300B. Cloud controller 311 may include a user interface ("UI") 310 for specifying the desired resources and other information used by the cloud to create the resources. In one embodiment, the UI 310 may be integrated into the client. Accordingly, a user may be able access controller 311 through the client (e.g., as a menu item or link). If additional resources are requested by the user of client system 313, the client may send authentication information to the controller 311 to ensure that the user requesting the resources has is authorized to do so. For example, at 301, the client may send a username and password to controller 311. Controller 311 may access authorization data 312 and compare authentication information received from the client to authorization data 312 to determine if the user is authorized to request cloud resources. For example, if the username and password received by the controller 311 from the client 313 match a username and password stored in the authorization data, then the controller 311 authorizes the user to request cloud resources.

Once the requester is authorized, cloud controller 311 sends a request for resources to a cloud management service 315 at 302. Cloud management service software component 315, which may be a web service executing on a server computer system connected to the Internet, for example, may receive the request and, in response to the request, access configuration data 316 for creating the desired resources specified in the request. Configuration data 316 may be stored in one or more cloud accessible databases, which may reside on a computer readable medium such as one or more hard disk drives. As an example, a user may request cloud controller 311 to create a server, which may be stored as an image in the configuration data. In response to the request, the cloud management service 315 may access the image and create an instance of the desire server—i.e., server instance software component 318. Configuration data 316 may also include information for creating a tunnel agent server software component 317. Tunnel agent server 317 may be used for establishing a secure connection between the server instance 318 and the local system 300A. Accordingly, when the request is received and processed by service 315, one or more images are accessed and instantiated, and the server instance 318 and a tunnel agent server 317 are created. In one example embodiment, the tunnel agent server 317 and server instance 318 are stored as a single image. In one implementation example, one tunnel agent server 317 may provide secure communications between the local system 300A and multiple server instances on the cloud computing system.

As described in more detail below, the request sent by the controller may include a plurality of parameters to be used by the cloud 300B to configure the tunnel agent server 317 and server instance 318. For example, as described below, the controller may generate shared security information for use by the tunnel agent server and a tunnel agent client. Accordingly, the request may include the shared security information (e.g., a shared key).

After the server instance 318 and tunnel agent server 351 are created, information for accessing these components may be returned to cloud controller 311. For example, the cloud controller may receive an internet protocol address (e.g., ec2-xxx-xxx-xxx-xxx.cloudnetwork.com) for accessing the new resources. In one embodiment, cloud controller 311 generates new security data to provide secure communications between the tunnel agent server 317, server instance 318, and local systems such as client 313. The new security data is created by cloud controller 311 and a copy of the security data is sent to both a tunnel agent client 314 and tunnel agent server 317. Tunnel agent client 314 may execute on a computer in the local system and may act as an access point for communications with cloud resources as illustrated by the examples below. In different embodiments, the security data may be a password, token, or a shared key, for example. At 304, controller 311 may send a shared key to tunnel agent client 314. At 303, controller 311 may send the same shared key to tunnel agent server 317. The shared security information may be generated before or after the request for additional resources is generated. Therefore, the shared security information may be sent with the request and used to configure the tunnel agent server or it may be sent separately in a follow up message.

Tunnel agent server 317 may act as a cloud-side connection point for local system 300A to communicate with resources on cloud 300B. For example, tunnel agent server 317 may provide the exclusive connection point for local system 300A to communicate with resources on cloud computer system 300B. Similarly, tunnel agent client 314 may act as a local system side connection point for cloud 300B to communicate with resources on local system 300A. For example, tunnel agent client 314 may provide the exclusive connection point for local system 300A to communicate with resources on cloud computer system 300B. In particular, tunnel agent client 314 includes a connection 350 that allows client 313 to communicate in a secure manner with resources on cloud 300B, and tunnel agent server 317 includes a connection 351 that allows server 318 to communicate in a secure manner with local system 300A. Accordingly, at 305, client 313 may send a message to server instance 318 by sending a communication from connection 350 of tunnel agent client 314 to connection 351 on tunnel agent server 317. Similarly, at 306, server 318 may send a message to client 313 by sending a communication from connection 351 of tunnel agent server 317 to connection 350 on tunnel agent client 314. In one example embodiment described in more detail below, communication channels between tunnel agent client 314 and tunnel agent server 317 are initiated exclusively by tunnel agent client 314.

Figure 4:
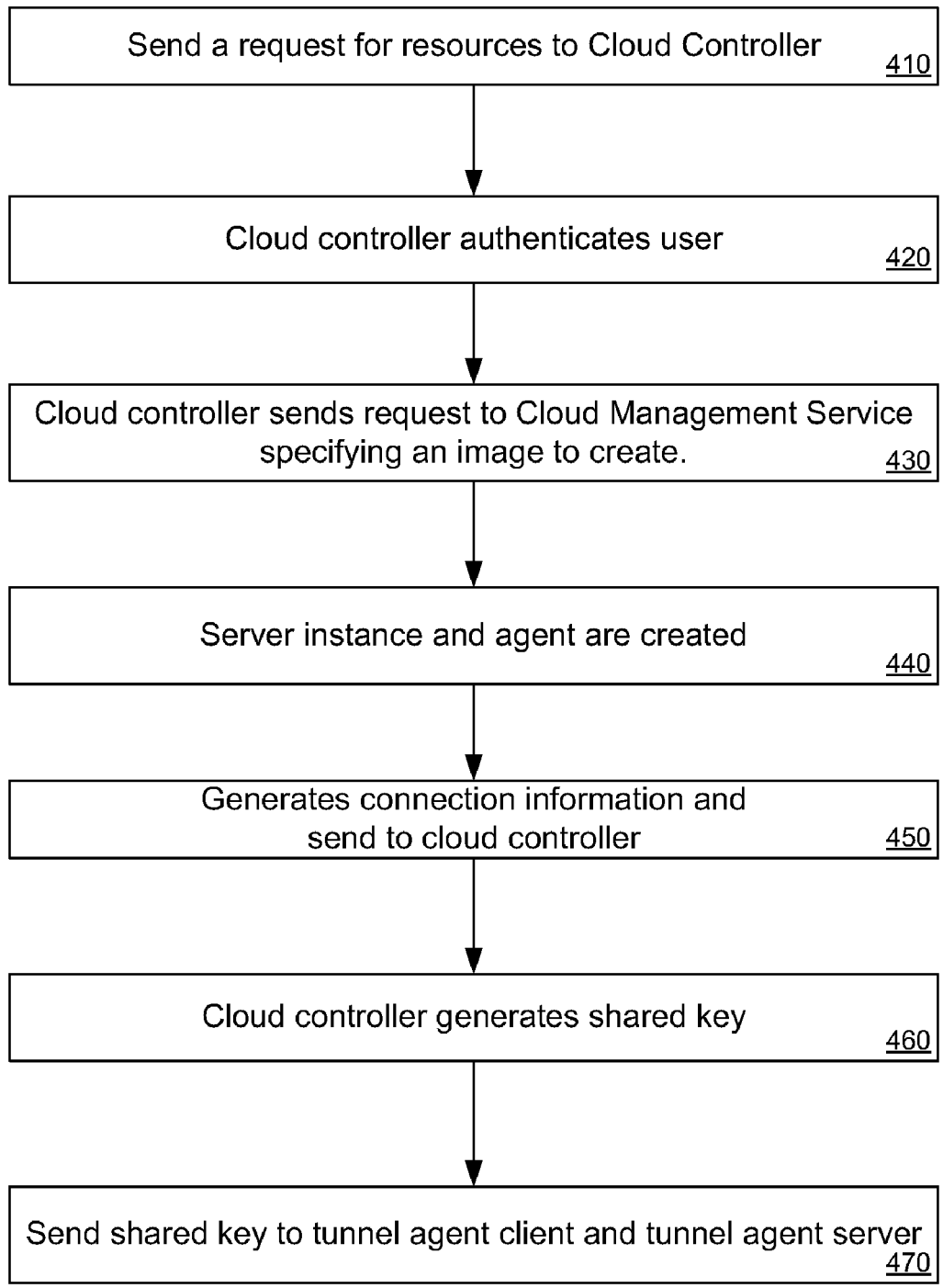
FIG. 4 illustrates a process of the integration of external resources with a local system according to one embodiment of the present invention.

FIG. 4 illustrates a process for the integration of external resources with a local system according to one embodiment of the present invention. At 410, a request is sent for cloud resources to a cloud controller. A request may include a username and password of a client system, for example. A cloud controller may compare this information to a stored list of users that are authorized to create new resources on the cloud, for example. If the username and password are found on the list, cloud controller authorizes the user at 420. At 430, cloud controller sends the request to a cloud management service specifying an image to instantiate. The configuration data for the image may be retrieved from a database. At 440, a server instance of the specified resource is created. A tunnel agent server is also created to interface with the local system. The tunnel agent server may have connection information to support communication with the software components in the local system (e.g., the cloud controller or the tunnel agent client). For example, connection information may describe how external resources may create a connection to the tunnel agent server. The connection information may include an Internet protocol address (e.g., a URL), and may further include a port number of the tunnel agent server, for example. At 450, the connection information may be forwarded to the cloud controller. Upon receipt of the connection information, cloud controller generates shared security information (e.g., a shared key) at 460. The shared security information may enable the tunnel agent client and tunnel agent server to communicate with one another in a secure manner. The shared security information may allow the tunnel agent client or server to encode a message, where the message can only be decoded using the shared security information, for example. At 470, the new shared security information is sent back to the tunnel agent client on the local system and the shared security information is also sent to the tunnel agent server on the cloud computing system.

Figure 5:
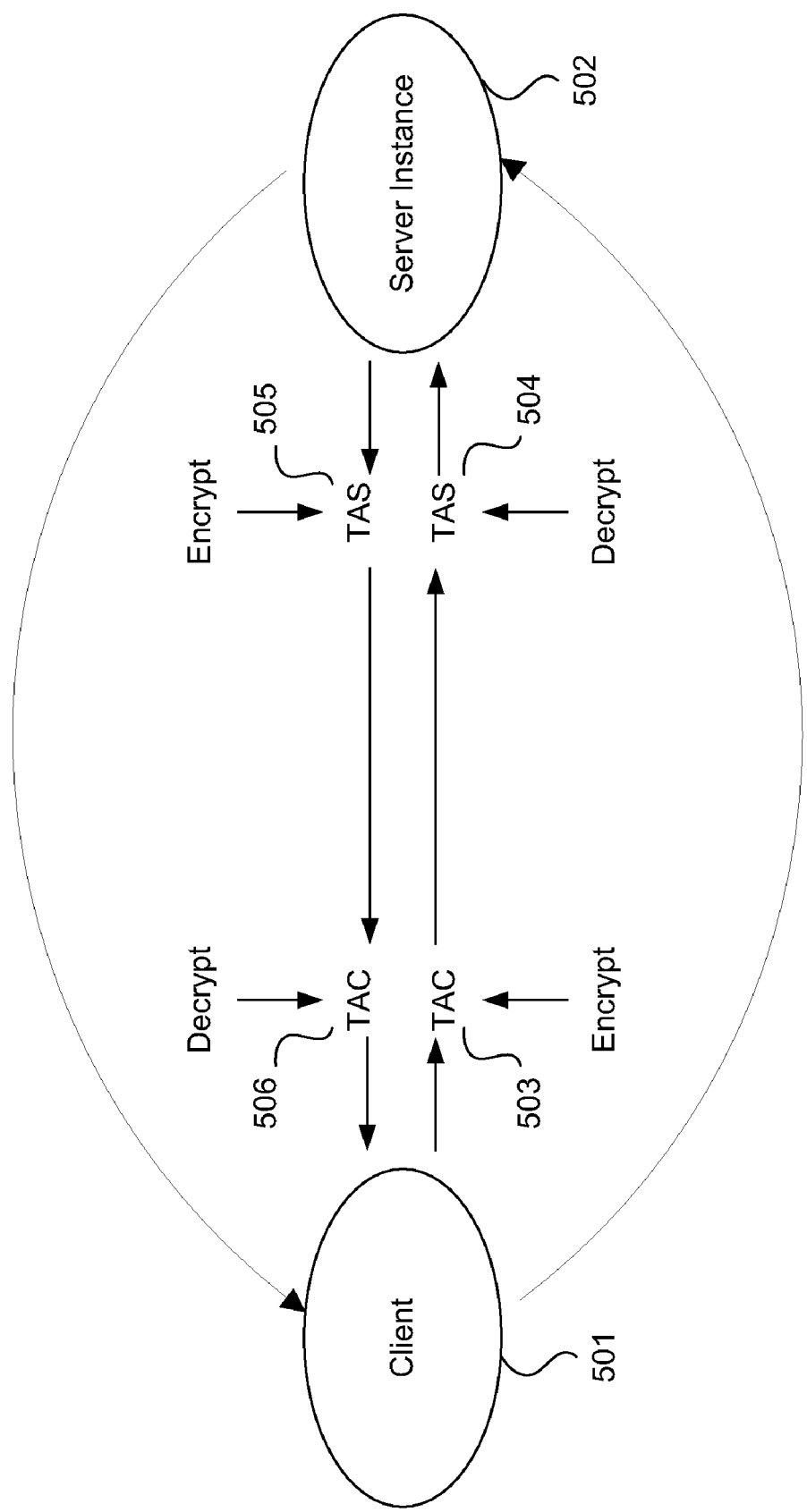
FIG. 5 illustrates a more specific example integration of external resources with a local system according to one embodiment of the present invention.

FIG. 5 illustrates an example secure communication between external resources with a local system according to one embodiment of the present invention. Features and advantages of the present invention include using shared security information (e.g., a shared key) between a tunnel agent client on a local system and a tunnel agent server on a cloud computing system to establish a secure channel between local resources and cloud resources. In this example, a secure connection may be established between a client 501 and server instance 502. When client 501 sends data to server instance 502, the data transmission may be secured by way of encryption, for example, using the shared key. If data is being sent from client 501 on a local system to server 502 on a cloud, the tunnel agent client ("TAC") may receive and encrypt the data at 503 using the shared security information received from the controller. The data is sent from the TAC to the tunnel agent server. At 504, tunnel agent server ("TAS") receives and decrypts the data using the shared key before it is processed at server instance 502. If data is being sent from server instance 502 to client 501, TAS may encrypt the data at 505 using the shared security information before it is sent. The encrypted data may be sent across a network and received by the TAC. The TAC decrypts the data at 506 using the shared security information before it is sent to the client 501.

FIGS. 6A-D illustrate communications between local resources and cloud resources according to one embodiment of the present invention. In one embodiment, a resource on the local system may send messages to a resource on the cloud by sending a message to a particular port on the local system resource, and a resource on the cloud may send messages to a resource on the local system by sending a message to a particular port on the cloud system resource. For example, a mapping may specify a relationship between ports on a local system resource and ports on the cloud resource. Similarly, another mapping may specify a relationship between ports on a cloud resource and ports on a local system resource. FIG. 6A illustrates a one-to-one mapping of ports on the local system to ports on the cloud. In FIG. 6A, port P1 on the local network may be mapped to port P5 on a cloud resource. Similarly, ports P2, P3, and P4 on the local network may be mapped to ports P6, P7, and P8, respectively, on a cloud resource. FIG. 6B illustrates a one-to-one mapping of ports on a cloud resource to ports on the local system resource. Here, ports M1 and M2 on the cloud resource are mapped to ports M3 and M4 on a local resource, for example.

FIGS. 6C-D illustrate the operation of the ports. A computer software component operating on the local system, such as a client or a server, for example, may send a message to a server instance on the cloud by sending the message to a specific local port. In this example, client 601 may send a message 650 to server instance 604 by sending message 650 to port P1. Tunnel agent client 602 is coupled to port P1. For example, tunnel agent client 602 may listen or intercept messages directed at port P1. Accordingly, messages sent to port P1 may be received by tunnel agent client 602 at 652. Port P1 may be mapped to a corresponding port P5 on the cloud resources. Accordingly, if a message is sent to port P1 on the local system, the message is automatically received and encrypted by tunnel agent client 602 and sent across a network (e.g., the Internet) to tunnel agent server 603. Tunnel agent server 603 receives and decrypts the message, and then sends the message to port P5 at 653. Server instance 604 may be coupled to receive messages on port P5, so the message received on port P5 is received by server instance 604 at 654, thereby effectively routing the message from the client 601 to server instance 604. If server instance 604 is coupled to receive information on additional ports P6, P7, and P8, tunnel agent client 602 may couple to corresponding additional ports P2, P3, and P4 to establish communications between local resources and the cloud resources on each port. It is to be understood that either tunnel agent client 602 or tunnel agent server 603 may implement the mapping of local ports to cloud ports, for example.

Similarly, server instance 604 may send a message 655 to client 601 by sending message 655 to port M1 on the cloud. Tunnel agent server 603 is coupled to port M1. For example, tunnel agent server 603 may listen or intercept messages directed at port M1. Accordingly, messages sent to port M1 may be received by tunnel agent server 603 at 656. Port M1 may be mapped to a corresponding port M3 on the local resources. Accordingly, if a message is sent to port M1 on the cloud system, the message is automatically received and encrypted by tunnel agent server 603 and sent across a network (e.g., the Internet) to tunnel agent client 602. Tunnel agent client 602 receives and decrypts the message, and then sends the message to port M3 at 657. Client 601 may be coupled to receive messages on port M3, so the message received on port M3 is received by client 602 at 658, thereby effectively routing the message from the server instance 604 to client 601. If client 602 is coupled to receive information on an additional port M4, tunnel agent server 603 may couple to a corresponding additional port M2 to establish communications between cloud resources and the local resources on each port. As mentioned above, it is to be understood that either tunnel agent client 602 or tunnel agent server 603 may implement the mapping of cloud ports to local ports, for example.

As a specific example, if server instance 604 is coupled to receive messages on port P5, and if port P5 is, in particular, port 22, then port 22 should be made accessible to client 601. However, if port 22 is already in use on the client system, then another port 10022 may be used on the client side. Accordingly, client 601 may send a message to port 10022, and the message is mapped to port 22 on the cloud resources. In one implementation, the tunnel agent serve may include configuration information for performing the mapping. For example, the tunnel agent server may include a configuration entry:
SERVICE localhost 22, where "SERVICE" is a service name, localhost resolves to an address, and 22 is the port.

Accordingly, if a connection request is received by the tunnel agent server 603 from the tunnel agent client 601 specifying P5, the data is automatically routed to port 22 on the local system, which in this case is the cloud system because the tunnel agent server is the receiving system. In this example, the tunnel agent client 602 may have a corresponding entry in the configuration data:
SERVICE 10022 (i.e., <name> and <port>)
The above configuration data may be used to instruct the tunnel agent client to couple to and receive messages on port 10022 and forward data received on that port to the tunnel agent server as "SERVICE". Referring to FIG. 6C, if as an example P1=10022 and P5=22, then the tunnel agent client will have configuration entry:
SERVICE P1.
In this example, the tunnel agent server will have configuration entry:
SERVICE localhost P5.
Accordingly, it is to be understood that a port on a client resource may or may not be mapped to the same port on a cloud resource. The tunnel agent server may not know what port number SERVICE is mapped to on the tunnel agent client, and the tunnel agent client may not know where SERVICE actually is on the cloud. The mapping may be done based on matching a service name in this case "SERVICE". The name may be sent as part of the open connection/open callback messages described in more detail below, for example, where the tunnel agent client and tunnel agent server both have a "SERVICE" configuration entry in their configuration files. In one embodiment, configuration data for the tunnel agent server may be stored inside the cloud image for the tunnel agent server, for example. Configuration data for the client may be maintained by the controller and forwarded to the tunnel agent client when it connects to the controller, for example. The tunnel agent client may store the configuration information locally, and may be automatically updated when it connects to the controller.

Using the example illustrated in FIG. 6A-D, a configuration file in the tunnel agent client may include configuration data for local services and remote services to perform the mapping. Configuration data for local services of the tunnel agent client may include the server name and port number to describe ports P1-P4, for example. Example configuration data for local services in the tunnel agent client may be of the following form: SSH 10022, Server1 3901, Server2 50000. Configuration data for remote services may include the service name, address, and port number to describe ports M3-M4, for example. Example configuration data for remote services in the tunnel agent client may be of the following form: QWA 10.17.69.177 3311, U7A 10.17.70.237 3377, U7B 10.17.70.237 3370. Likewise, a configuration file in the tunnel agent server may include configuration data for local services or remote services to perform the mapping. Configuration data for local services of the tunnel agent server may include the service name and port number to describe ports M1-M2, for example. Configuration data for remote services of the tunnel agent server may include the service name, address, and port number to describe ports P5-P8, for example.

Figure 7A:
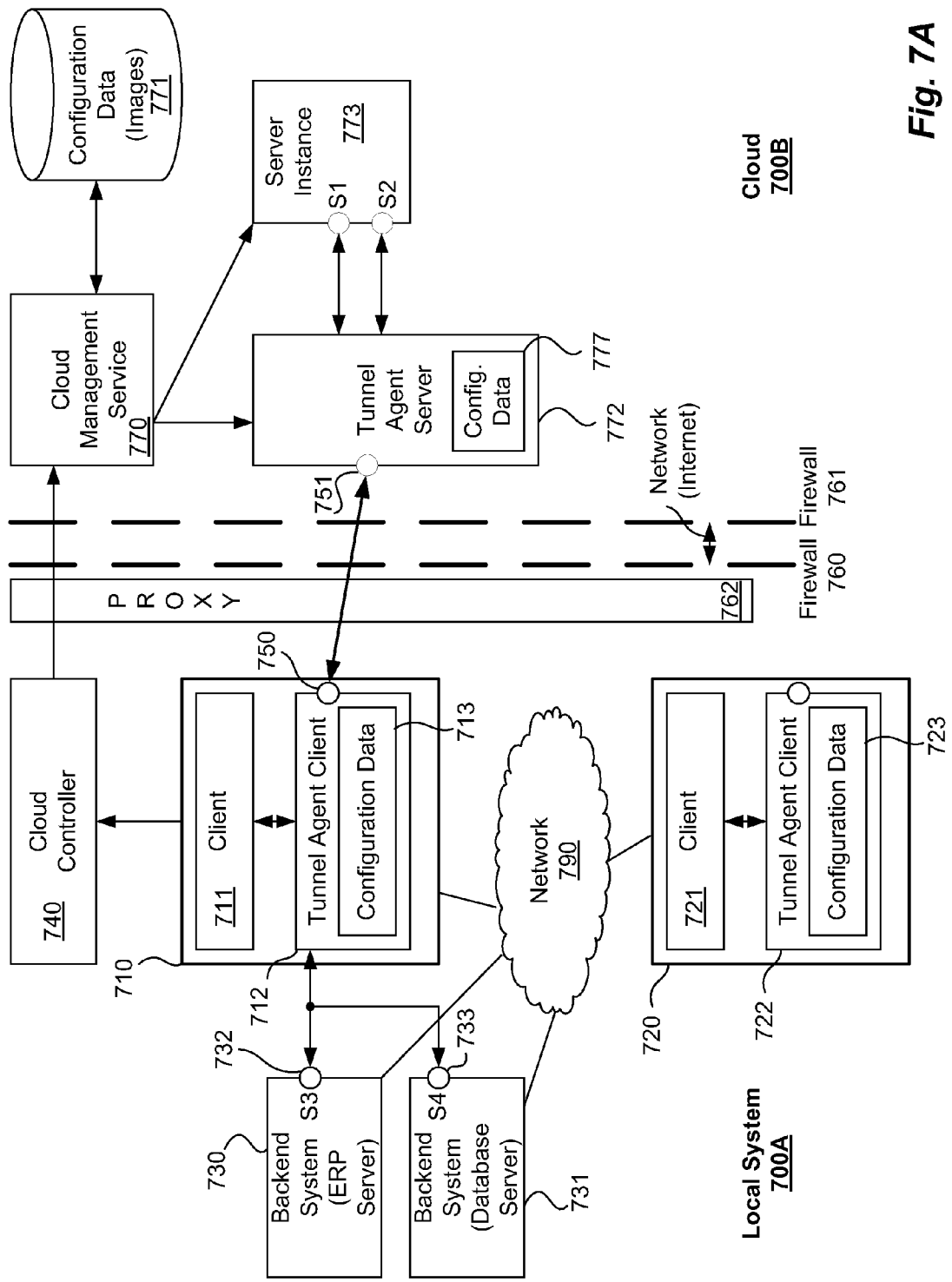
FIGS. 7A-B illustrate communication between local resources and cloud resources according to another embodiment of the present invention.
Figure 7B:
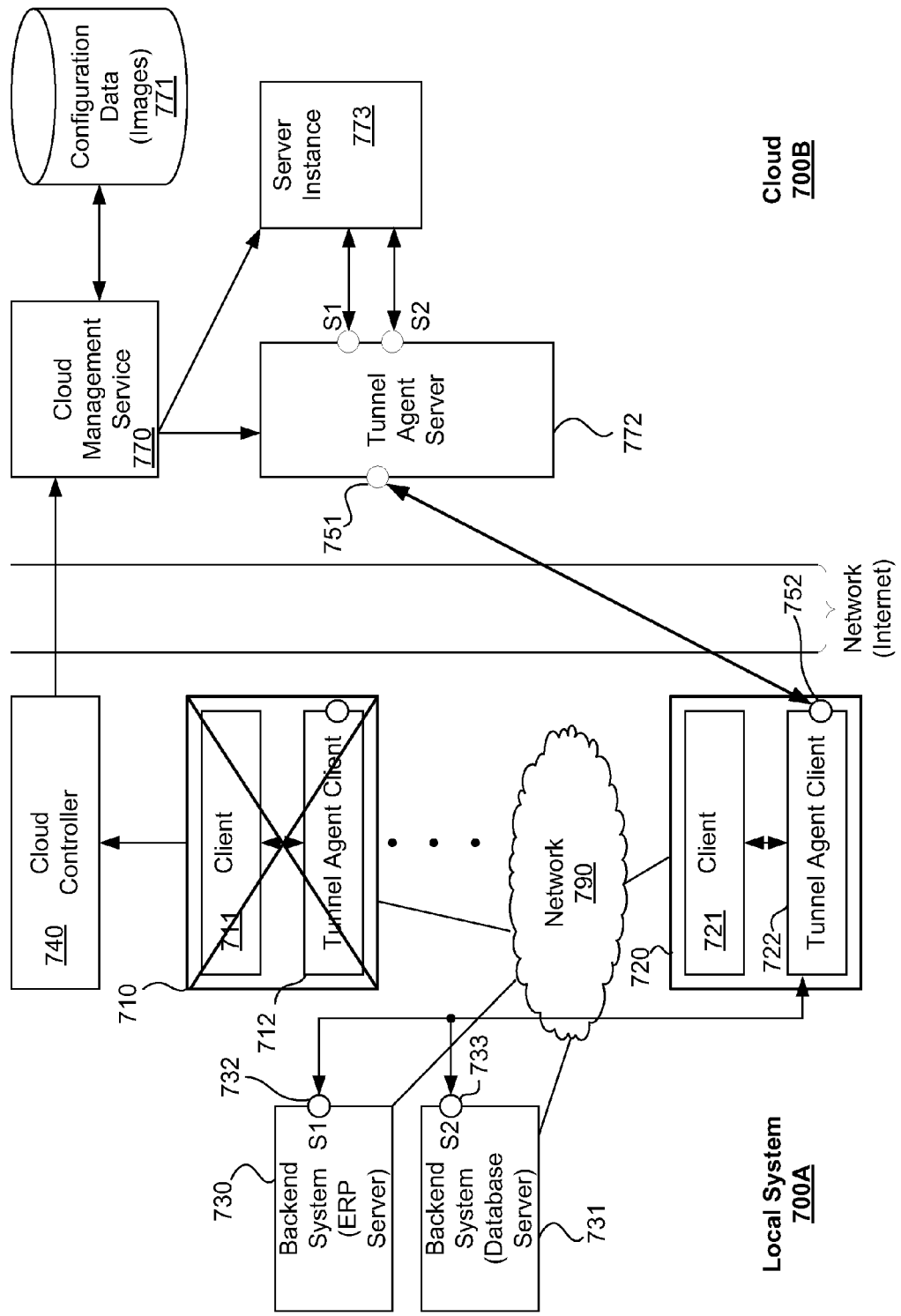

FIGS. 7A-B illustrate communication between local resources and cloud resources according to another embodiment of the present invention. In this embodiment, local system 700A includes multiple local computer systems 710 and 720 coupled together using a network 790, such as a local Ethernet or Intranet (e.g., computers 710 and 720 are in a common network inside firewall 760). Here, each computer 710 and 720 includes a client software system 711 and 721, respectively. Additionally, each computer includes a tunnel agent client 712 and 722, respectively, for communication with cloud computer system 700B. Each client may be configured to use resources on cloud computing system 700B. Resources on local system 700A may communicate with resources on cloud computer system 700B over another external network, such as the Internet. Communications between computer resources on local system 700A and the Internet may be channeled through a proxy 762, for example. Further, clients 711 and 721 may each be local software applications, such as a Netweaver Design Studio Application, executing on a user's laptop or desktop computer. Each client software application may be configured to access a server instance 773 implemented on cloud computing system 700B. According to one example embodiment of the present invention, when a first user starts a first client 711, cloud controller 740 may authenticate and authorize the user as described above, and send a request to create a server instance to cloud management service 770. An image of the server instance 773 is extracted from repository 771 and instantiated. A tunnel agent server 772 may also be stored as an image and instantiated.

In this example, the tunnel agent client ("TAC") 712 and tunnel agent server ("TAS") 772 provide secure access to pre-configured services (tcp ports) from the local network of the TAS to the TAC and vice-versa. Security may be based on secure socket layer ("SSL") and pre-shared keys used for client authentication. In some implementations, no direct connections can be made between the TAS and TAC networks because of firewalls and/or https proxies. Accordingly, in this example only the TAC can initiate a connection to the TAS— i.e., TAC 712 exclusively initiates connections with TAS 772. In other words, in this example tunnel agent server cannot initiate a connection with tunnel agent client as described in more detail below.

In this example, there are three (3) types of connections. The first is referred to herein as a "service connection." A service connection is established by the TAC when it initially connects to the TAS, and may later be used by the TAS to request a new connection be established by the TAC for use as a callback connection as described below. The second connection is referred to as a "forward connection." A forward connection may be accepted by the TAC and forwarded to an address inside the TAS network. A forward connection may be used for communication between a client 711 and server instance 773, for example. The third connection is referred to herein as a "callback connection." A callback connection may be accepted by the TAS from a server instance on the cloud and forwarded to an address inside the TAC network to another system other than the client (e.g., a server running a backend system). Callback connections may be used to allow a server instance to access resources on backend systems, such as retrieving data from a backend ERP system or database, for example. Connections may be established by connecting to ports, and messages may be routed through the connections. Once a connection is established, it may be assigned a connection ID, for example, which may indicate the appropriate recipient for a received communication. Communication between software components may include the use of configuration data in the TAC 713 and 723 and configuration data in the TAS 777, for example. One example of configuration data for the tunnel agent client and configuration data for the tunnel agent server is shown in Appendix A.

In this example, there are two modes of the client-server tunnel agent connections—"service" and "data". As mentioned above, connections to the TAS are initiated exclusively by the TAC or the controller and may initially be in "service" mode. In service mode, the TAS may parse the incoming message for authentication and to determine what operation is requested with this connection. For most operations the server will reply with Ack message that holds the result code of the operation (e.g., OK or some ERROR). If the connection is a forward or callback connection both sides (client and server) will switch then to "data" mode to transfer the actual data.

Service Connection:

In this example, when a connection is first established it is a service connection. Service connections are used for sending service messages back and forth between the TAC and TAS. A service connection protocol may be based on serializable java objects. For example, "serializable" java objects may be used to share data between two java programs (e.g., a java implementation of the TAC and TAS). Data may be encoded before it is sent over the network. This example encoding is called "serialization." The serialization of java objects is described in details and is part of the java language specification. The following are examples of service messages definitions:

AckMessage—used as a confirmation that a message was received and processed and contains the result of the operation (ok or error code).

ClientInit—sent by the TAC to initiate new "forward" connection. The TAS replies with AckMessage.

ServerInit—The TAS sends this to request a callback connection. The TAC creates a callback connection and sends this message on the new connection so the TAS can match the connection id for the established callback connection.

Disconnect—TAC or TAC may sent this message to notify the other side that they will close the connection.

OpenCallback—sent by the TAC on the local system to request to become a "router" for a callback service. Server replies with AckMessage. The message may be of the following form:

[Message Type][Shared Key][System Name]

For example, If a TAC with shared key of "asdfasdrff32re23" tries to open a service connection for backend system "QWA", the format of the message is:

[OPEN_CALLBACK][asdfasdrff32re23][QWA]

ListCallbacks—sent by the controller to list the currently configured callbacks. The server replies with ListCallbacks Reply message.

ListCallbacksReply—send by the server as a response to a ListCallbacks message. The "List Callbacks" message is a list of the established callback connections. The list itself may be a serializable java object so it is encoded using the java serialization specification. In decoded form, the contents may be as illustrated in the following example. The TAS may have two callback/backend ports in its configuration—QWA 3310 and U7A 3710. There may exist two active connections to QWA and none to U7A. The format of single row of the list is in a "ListCallbacks" is:
[Service Name][client secret key][client address][connection id][status of the tunnel]
The "connection id" in this example is the id of the connection created by the TAC in response to a request for a callback connection. For this example, the list is as follows:
[QWA][asdfuhyi3-fsddr23][85.32.24.15][12][1]
[QWA][asdfuhyi3-fsddr23][85.32.24.15][13][1]
[U7A][ ][ ][ ][0]
Wherein "asdfuhyi3-fsddr23" is the TAC shared key and 85.32.24.15 is the TAC address. The TAC in this example is the TAC acting as a router for QWA. Status code 1 means "established". For U7A there are no connections so the fields are empty. Status code 0 means "not connected." In this example, "established" and "not connected" are defined, but other status codes may be define in other embodiments.
RegisterCallback—sent by the controller to register new callback service on the TAS. The TAS will first create a backup of the old service configuration and then save the new configuration and activate the service. The TAS responds with AckMessage. This message may be sent by the controller if a new backend server is added to the local system, for example.
RegisterClient—sent by the controller to register new client authentication string (i.e., a shared key for the TAC) with the TAS. The server responds with AckMessage.
UnregisterCallback—sent by the controller to the TAS to remove the configuration for a callback service. The TAS will create a backup of the old configuration, save the new configuration and disable the callback service. The TAS responds with AckMessage
UnregisterClient—sent by the controller to unregister client authentication string (i.e., a shared key for the TAC). After this, commands from TACs using this string will be rejected. The TAS responds with AckMessage Forward Connection Initiation Connections from a TAC to a TAS are initiated by a "ClientInit" message. For example, when a connection is made by a local system, such as client 711, to a TAS port (or server socket) where the TAC 712 is listening for some local service, the TAC 712 may establish a new connection to the TAS 772 and send an initialization message ("ClientInit"). The initialization message ("ClientInit") may be sent by the TAC 712 to initiate new "forward" connection. The TAS 772 may reply with an acknowledgement message ("AckMessage"). The AckMessage is used as a confirmation that a message was received and processed and contains the result of the operation (e.g., "ok" or an error code). Next, the TAS 772 checks the authentication of the requesting TAC using the shared key, checks the service, and opens a connection to the target destination (e.g., server instance 773). If the TAC is authenticated and the service connection to the server instance 773 is established, then the TAS sends the AckMessage. For a forward connection, the connection starts in "service mode" for transferring initialization messages as described above, and then switches to "data mode" if the TAC is authorized and the TAS successfully completes the above steps. Accordingly, if the AckMessage is sent by the TAS and received by the TAC, both sides switch to the data forward protocol. If some error occurs (for example the destination service is not available at the moment)—the TAS will send the corresponding ERROR AckMessage and terminate the connection. Once in data mode, messages may be sent between the local system resources and cloud resources using the TAC and TAS. For example, a data message for a forward connection may be a 4 byte length header and body. The body may be the size specified in the 4 byte header (e.g., serialized integer using standard java byte ordering). The body is the actual data that is being forwarded by the connection (unmodified). Messages with length=0 are used as pings to keep the proxy alive and may discarded by the remote side when received, for example.

Features and advantages of the present invention include sending communications between multiple backend systems on local system 700A through a single tunnel agent client to the cloud. In this example, if no other tunnel agent clients have connected to the cloud, tunnel agent client 712 may connect to the cloud and may send and receive all communications between one or more backend systems and one or more server instances 773. Here, if tunnel agent client 712 is the first agent activated, then tunnel agent client 712 on computer system 710 is the only tunnel agent client running. Accordingly, it may establish a connection with tunnel agent server 772 and it establishes a single connection point between backend systems on local system 700A and cloud 700B. Specifically, in this example, tunnel agent client 712 on computer system 710 may send and receive communications (e.g., requests, data, messages, instructions, replies/responses, etc. . . . ) between backend system 730-731 and server instance 773.

Figure 8A:
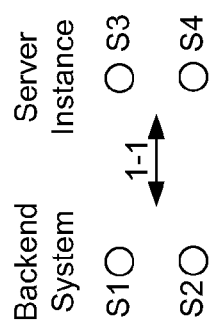
FIGS. 8A-B illustrate an example of secure communications between a local system and resources on a cloud computing system according to another embodiment of the present invention.

More specifically, in this example server instance 773 may send messages or other communications to backend software systems 730-731 by establishing a callback connection and sending messages via ports S1 and S2, for example. Tunnel agent server 772 may listen for communications on ports S1 and S2, for example. Tunnel agent 772 may be configured to receive and automatically forward communications transmitted on ports S1 and S2 by server instance 773 across a network (e.g., the Internet) to tunnel agent client 712 and backend systems 730 and 731. In this example, port S1 is mapped to port S3, which is coupled to backend system 730, and port S2 is mapped to port S4, which is coupled to backend system 731. FIG. 8A illustrates the mapping of cloud resource ports and local system ports, for example. Accordingly, a connection may be established between server instance 773 using port S1 and backend system 730 using port S3. Similarly, a connection may be established between server instance 773 using port S2 and backend system 731 using port S4. Therefore, server instance 773 may seamlessly communicate with either backend systems 730 or 731 by sending communications to ports S1 or S2, or both.

Figure 8B:
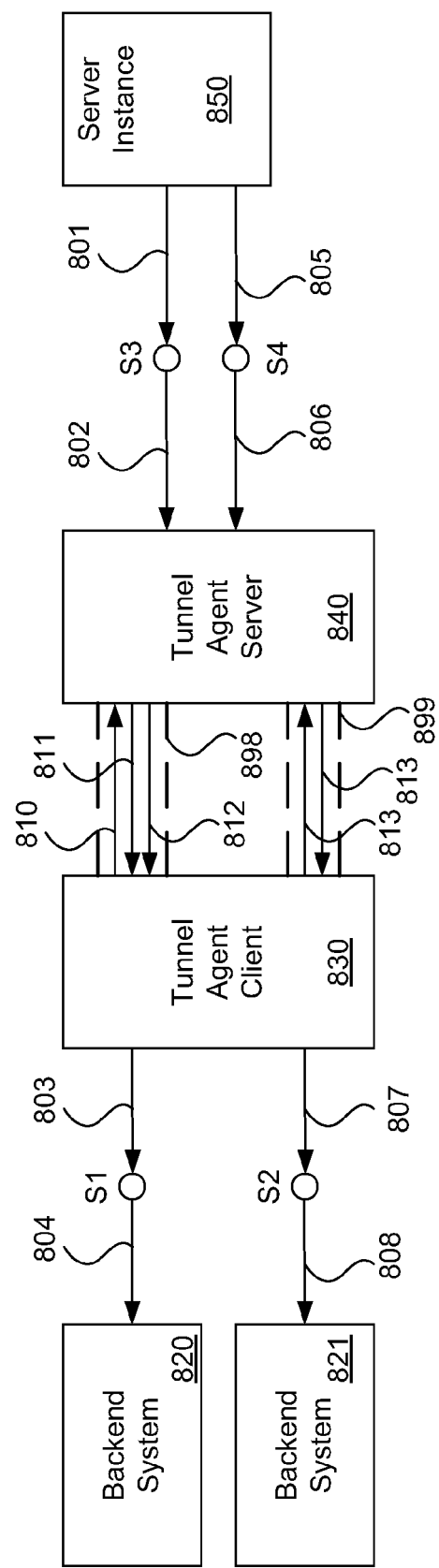

In this example, tunnel agent client 712 is the single connection point between backend resources on and cloud resources. FIG. 8B illustrates connections and messaging according to an embodiment of the present invention. In one embodiment, when TAC 712 connects to the TAS 772 for the first time, it will establish a service connection illustrated by dashed lines 898. The TAC 712 may send an "OpenCallback" at 810 across the service connection for the callback services it is configured to route. Specifically, the TAC may have the corresponding entry in the configuration file for routing callback services to a backend system such as QWA as follows:
QWA 192.168.1.138 3310.
Accordingly, the OpenCallback is as follows:
[OPEN_CALLBACK][asdfasdrff32re23][QWA].
The callback services may be services provided by backend systems 730 and 731, for example. If the TAS 772 also has this service configured and no other TAC is currently the router for this service, then the TAS 772 will respond with OK AckMessage at 811. The term "service" is used here to refer to a function provided when a system establishes a connection to a specific address and port. It could be database access or a web page, for example. The "service" may be a "name, address, and port" of a particular software application and may be used in the configuration files of the TAC and TAS, for example. One particular service may be "QWA 192.168.1.102 3310", which refers to Service—QWA that is available on address 192.168.1.102 and port 3310," Since both the TAC and TAS have separate configuration files in this example, a service may be "configured" if the service has an entry in the configuration file (e.g., if service QWA with the corresponding address and port are in the configuration file).

At this point the client becomes a "router" for this callback service and the connection becomes a "service connection" for the callback service. When a connection is made to the server socket on the server for that service (e.g., Service QWA on port 22 on the TAS, or the service on ports S3 and S4 on FIG. 8B), the TAS 772 will send ServerInit to the TAC 712 at 812 via the service connection. The TAS 772 sends the ServerInit message to request that TAC 712 open a callback connection. The ServerInit message contains a connection id. The connection id may be a random generated string or the number of the connection in the order the connections are established (first one will be 1, next 2, 3 . . . and so on), for example. When the TAC 712 receives the ServerInit message it will check the service configuration and try to connect to the configured address for that service. The TAC 712 may then open a new SSL connection to the TAS 772. The new connection is initially in service mode. At 813, the TAC 712 sends an InitMessage command containing the connection id received in the ServerInit message. The TAS 772 may receive the InitMessage and match the connection id sent in the ServerInit message to the connection id received over the new connection in the InitMessage and establish the new connection. Both sides switch to data mode. If the TAC 712 cannot establish the requested connection it may respond with Disconnect for that connection id.

FIG. 8B further illustrates the operation of the ports. In this example, server instance 850 may send a message 801 to backend system 820 by connecting to port S3. Tunnel agent server 840 is coupled to port S3. For example, tunnel agent server 840 may listen or intercept messages directed at port s3. Accordingly, messages sent to port S3 may be received by tunnel agent server 840 at 802. Port S3 may be mapped to a corresponding port S1 on local system 700A. Accordingly, if a message is sent to port S3 on the cloud system, the message is automatically received and encrypted by tunnel agent server 840 and sent across a network (e.g., the Internet) to tunnel agent client 830. Tunnel agent client 830 receives and decrypts the message, and then sends the message to port S1 at 803. Backend system 820 may be coupled to receive messages on port S1, so the message received on port S1 is received by backend system 820 at 804, thereby effectively routing the message from the server instance 850 to backend system 820. If another backend system 821 is coupled to receive information on another port S2, tunnel agent server 840 may couple to corresponding additional port S4 to establish communications between cloud resources and the local resources on such a port.

In one embodiment, communications for multiple backend software systems running on multiple computer systems may be automatically re-routed through another tunnel agent client if the currently active tunnel agent client is shut down. FIG. 7B illustrates how communications are re-routed if the current tunnel agent client connection point is shut down (e.g., if computer system 710 is turned off). If the user of computer system 710 turns off the computer, and thereby turns off client 711 and tunnel agent client 712, one of the other tunnel agent clients 722 automatically re-establishes a connection to tunnel agent server 772 and server instance 773 on cloud 700B. Backend system communications are then sent to the active tunnel agent client and forwarded to the cloud. In one embodiment, each tunnel agent client on each computer system automatically sends out a periodic request to controller 740 to determine if another tunnel agent client is currently acting as the single connection point for callback connections to the local network. Each tunnel agent client may continue to request a connection on a periodic basis until the existing connection is deactivated, at which time the requesting tunnel agent client may be granted the necessary connection information to establish the new connection. Referring to FIG. 7B, after computer system 710 shuts down, tunnel agent client 722 may, in response to a periodic request, be sent the information to create the callback connection to tunnel agent server 772. Accordingly, tunnel agent client 722 becomes the single callback connection point to the cloud and communications between backend systems 730-731 and server instance 773 are routed through tunnel agent client 722.

Figure 9:
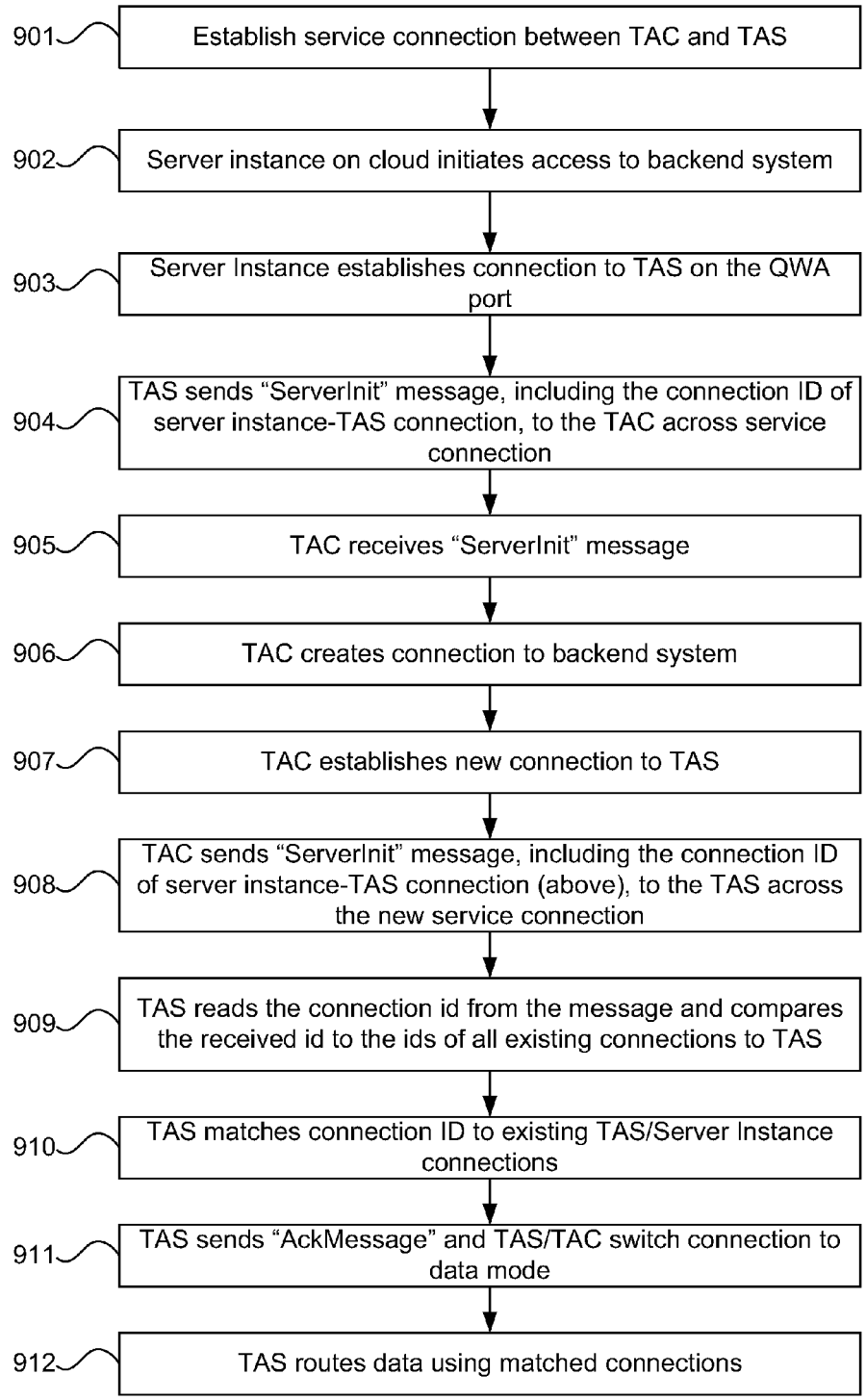
FIG. 9 illustrates an example process for establishing connections between server instances on a cloud and a backend software system on a local network according to an embodiment of the present invention.

FIG. 9 illustrates an example process for establishing connections between server instances on a cloud and a backend software system on a local network according to an embodiment of the present invention. Referring to FIG. 7A, in this example process backend system 730 may be a server providing a service "QWA" running inside the local network 700A. At 901, a service connection may be established between the TAC 712 and TAS 772. This may be illustrated by connection 898 in FIG. 8B, which is initiated by TAC sending message 810 and TAS responding with an acknowledgement at 811, for example. At 902, server instance 773 on cloud 700B may initiate access to backend system 730. At 903, server instance 773 establishes a connection to TAS 772 on the port corresponding to the QWA service (see port S3 and connections 801 and 802 in FIG. 8B). At 904, TAS 772 generates a "ServerInit" message to indicate to TAC 712 to establish a connection between server instance 773 and backend system 730 (see message 812 in FIG. 8B). The "ServerInit" message is sent across connection established at 901 (e.g., connection 898 in FIG. 8B). In this example, the "ServerInit" message includes a connection ID for the connection between server instance 773 and TAS 772. At 905, TAC 712 receives the "ServerInit" message. At 906, TAC 712 creates a connection to backend system 730 (e.g., to service QWA). If the connection to the backend system 730 is successfully established, TAC 712 initiates a new connection to TAS 772 at 907. At 908, TAC 712 generates a "ServerInit" message to indicate to TAS 772 to establish a new connection between TAC 712 and TAS 772 for communications between server instance 773 and backend system 730. The "ServerInit" message is sent across new connection established at 908 (e.g., see message 813 sent across connection 899 in FIG. 8B). In this example, the "ServerInit" message includes the connection ID for the connection between server instance 773 and TAS 772 which was previously sent from TAS 772 to TAC 712 at step 904. At 909, TAS receives and reads the connection ID in the "ServerInit" message and compares the connection ID to the connection IDs of all existing connections to the TAS (e.g., the connection via port S3 and connection at 801 and 802 in FIG. 8B). At 910, TAS 772 matches the connection ID received from TAC 712 with an existing connection ID. If the received connection ID matches a connection ID for an existing TAS/server instance connection, then TAS 772 generates and sends an "AckMessage" to TAC 712 and both the TAC and TAS switch the connection from service mode to data mode at 911. Accordingly, TAS 772 routes data received from the server instance 773 using the matched connections. Thereafter, the TAS 772 sends data received from server instance 773 to service QWA on backend system 730 through TAC 712 using the matching connection between the server instance and the TAS and the new TAC/TAS connection (e.g., new connection 899 in FIG. 8B). The server instance/TAS connection, the backend system/TAC connection, and the data connection established between the TAC/TAS may be TCP/IP connections that together form a virtual tunnel connection between the server instance in the cloud computing system and the backend server system in the local network.

Referring again to FIG. 7B, the following example illustrates re-routing of data. In this example, no configuration information is changed when re-routing is done. Example data for accessing an ERP system 730 via port S1 may be as follows: S1 port number=3310, and the address of ERP system 730 is 192.168.1.103. Configuration data for TAS 772 may include the following entry in "local_services.txt" configuration file:
S1 3310
TAC 722 and 712 may include the following entry in "remote_services.txt" configuration file:
S1 192.168.1.103 3310
An initial route is established when computer 710 is started and TAC 712 connects to the TAS 772. TAC 712 sends an "OpenCallback" message for S1 and, because there is no other client connected, becomes the router for S1. The procedure was described in more details above. Then computer 720 is started, and TAC 722 also connects to TAS 772. TAC 722 also sends an "OpenCallback" message for S1, but TAC 712 is already the router. Accordingly, TAS 772 responds with "AckMessage=error (e.g., "ERROR_ALREADY_REGSITERED"), which indicates that a callback connection already exists through another TAC. TAC 712 may continue to be the router for allowing the server instance to access the backend system and S1. TAC 722 may sleep for a period of time (e.g., 30 sec) and then may retry (e.g., establish connection, send OpenCallback, Ack=error). At some point in time, client software 721 may access functionality from Server Instance 773 that in turn requires data from backend system 730 (e.g., an ERP system access). For example, if client software 721 is a web browser, such as Internet Explorer, functionality provided by Server Instance 773 may be a web page showing scheduled flights for a specific date and the data for the flights is stored in the ERP System 730. In this scenario, TAC 712 does not need any functionality that depends on the ERP 730, but as TAC 712 is the active router for this system, the connection will be made through it.

At this point a virtual tunnel is created between the server instance and the backend system, and data is transferred from ERP 730 to Server Instance 773, for example. TAC 722 may keep sending the "OpenCallback" message every 30 seconds, but as long as TAC 712 is running, TAS 772 will reply with AckMessage ERROR_ALREADY_REGSITERED and the connections to ERP 730 will be carried by TAC 712.

If, at some point, computer 710 is shut down, then the connections between TAC and TAS are broken (e.g., connections 898 and 899 in FIG. 8B). In one embodiment, the breaking of service connection 898 in FIG. 8 triggers (signals) TAS 772 that there is no more router TAC for S1. Breaking connection 899 in FIG. 8 may automatically signal TAS 772 that it must also terminate the server instance/TAS connection. Breaking the server instance/TAS connection, in turn, signals Server Instance 773 that the backend system 730 cannot be accessed anymore through that connection. Next, after 30 second delay expires, TAC 722 sends another "OpenCallback" message. At this point, TAC 712 is no longer an active router between the backend system and the server instance. Accordingly, there is no router for S1, so TAS 772 may reply with "AckMessage"=OK, and TAC 722 may become the new router for S1.

Client software 721 may again access Server Instance 773, which in this example may attempt to access ERP 730. As the previous server instance/TAS connection was broken, Server Instance 773 may create a new one to replace it, which may trigger a callback connection procedure described above, but this time trough TAC 722. After the callback connection is reestablished through TAC 722, access to the backend ERP system is moved over to be routed by machine 720, data is accessible and the re-routing is complete.

Figure 10:
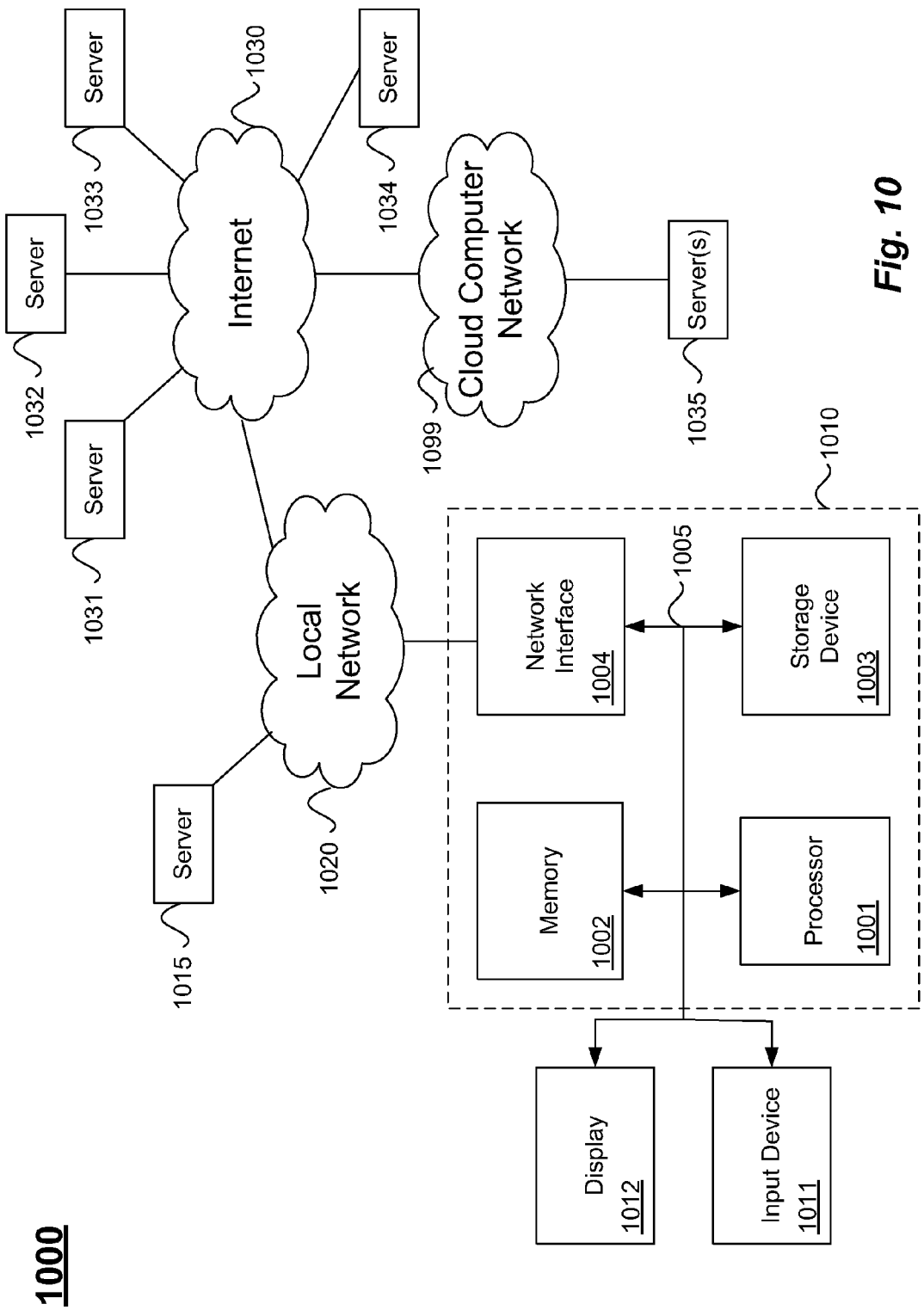
FIG. 10 illustrates hardware of a machine configured with processes according to embodiments of the present invention.

FIG. 10 illustrates hardware of a machine configured with processes according to embodiments of the present invention. As mentioned above, the computer systems and software servers on a local network may communicate with each other and other computer systems and servers running instances of programs on a cloud computer system. An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015 one or more of which may run backend system software such as an ERP software system, CRM, or database for example. Accordingly, computer system 1010 and server computer systems represented by server 1015 may form a local network, which may be programmed with processes described herein. In the Internet example, software components or services executing on computer system in the local network may communicate with computer programs on a cloud network 1099 across the Internet. Communications with program on the Internet may include communication with programs residing on multiple different computer systems 1010 or servers 1031-1035 across the network. The processes described above may be implemented for communication with programs implemented on one or more servers, for example. A server 1035 on cloud 1099, for example, may transmit messages through Internet 1030, local network 1020, and network interface 1004 to a component on computer system 1010. The software components and processes described above may be implemented on any computer system and send and/or receive information between networks as set forth above, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, while the TAC was described in the above examples as residing on a client, it is to be understood that the TAC may be located on a server or other software components in some other embodiments. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    storing an image of a software server on a cloud computer system;
    creating an instance of the server on the cloud computer system;
    generating shared security information;
    storing the shared security information in a first software component in a local network and in a second software component on the cloud computer system;
    establishing a connection between a client software system in the local network and the server instance on the cloud computer system, wherein the connection is coupled through the first software component coupled to the client software system on the local network and the second software component coupled to the server instance on the cloud computer system; and
    sending a message from the client software system to the server instance, wherein the message is sent from the client software system to the first software component, wherein the first software component encodes the message using said shared security information, wherein the encoded message is sent from the first software component to the second software component across a first network, wherein the second software component decodes the encoded message using said shared security information, and wherein the second software component sends the decoded message to the server instance, wherein establishing said connection comprises:
        establishing communication between the server instance on the cloud computer system and a backend system on the local network through the first and second software components, and if said first software component is shut down, automatically re-establishing the connection between the server instance on the cloud computer system and the backend system on the local network through a third software component on the local network and the second software component, wherein the first and third software components are different instances of the same program on different computers,
    wherein said connection comprises:
        a service connection for establishing communication between the first software component and the second software component; and
        a callback connection for establishing communication between the server instance on the cloud computer network and the backend system on the local network.

2. The method of claim 1 wherein said connection is initially in a service mode, and wherein said connection transitions into a data mode after an initialization process.

3. The method of claim 1 wherein establishing said connection comprises:
    said first software component sending a message to said second software component to initiate a new connection between the client software system on the local network and the server instance on the cloud computer system; and
    said second software component responding with an acknowledgement message if the connection is ready to be established.

4. The method of claim 1 wherein establishing said connection comprises:
    said second software component sending a request across a first service connection to create a connection between the server instance on the cloud computer system and a backend system on the local network; and
    said first software component creating a second connection for communication between the server instance on the cloud computer system and a backend system on the local network.

5. The method of claim 1 further comprising storing configuration data in the first software component and the second software component, wherein the configuration data maps messages received on one or more first ports of computing resources on the local network to one or more second ports of computing resources on the cloud computer system.

6. The method of claim 1 further comprising storing configuration data in the first software component and the second software component, wherein the configuration data maps messages received on one or more first ports of computing resources on the cloud computer system to one or more second ports of computing resources on the local network.

7. The method of claim 1 further comprising storing configuration data for mapping messages received between local network ports and ports on the cloud computer system, wherein first configuration data stored on one of either the first or second software component comprises at least service name and port, and wherein second configuration data stored on the other one of the first or second software component comprises at least service name, network address, and port.

8. A non-transitory computer readable medium embodying a computer program for performing a method of multi-threaded processing, said method comprising:
- storing an image of a software server on a cloud computer system;
- creating an instance of the server on the cloud computer system;
- generating shared security information;
- storing the shared security information in a first software component in a local network and in a second software component on the cloud computer system;
- establishing a connection between a client software system in the local network and the server instance on the cloud computer system, wherein the connection is coupled through the first software component coupled to the client software system on the local network and the second software component coupled to the server instance on the cloud computer system; and
- sending a message from the client software system to the server instance, wherein the message is sent from the client software system to the first software component, wherein the first software component encodes the message using said shared security information, wherein the encoded message is sent from the first software component to the second software component across a first network, wherein the second software component decodes the encoded message using said shared security information, and wherein the second software component sends the decoded message to the server instance wherein establishing said connection comprises:
- establishing communication between the server instance on the cloud computer system and a backend system on the local network through the first and second software components, and if said first software component is shut down, automatically re-establishing the connection between the server instance on the cloud computer system and the backend system on the local network through a third software component on the local network and the second software component, wherein the first and third software components are different instances of the same program on different computers, wherein said connection comprises:
- a service connection for establishing communication between the first software component and the second software component; and
- a callback connection for establishing communication between the server instance on the cloud computer network and the backend system on the local network.

9. The computer readable medium of claim 8 wherein said connection is initially in a service mode, and wherein said connection transitions into a data mode after an initialization process.

10. The computer readable medium of claim 8 wherein establishing said connection comprises:
- said first software component sending a message to said second software component to initiate a new connection between the client software system on the local network and the server instance on the cloud computer system; and
- said second software component responding with an acknowledgement message if the connection is ready to be established.

11. The computer readable medium of claim 8 wherein establishing said connection comprises:
- said second software component sending a request across a first service connection to create a connection between the server instance on the cloud computer system and a backend system on the local network; and
- said first software component creating a second connection for communication between the server instance on the cloud computer system and a backend system on the local network.

12. The computer readable medium of claim 8 further comprising storing configuration data in the first software component and the second software component, wherein the configuration data maps messages received on one or more first ports of computing resources on the local network to one or more second ports of computing resources on the cloud computer system.

13. The computer readable medium of claim 8 further comprising storing configuration data in the first software component and the second software component, wherein the configuration data maps messages received on one or more first ports of computing resources on the cloud computer system to one or more second ports of computing resources on local network.

14. The computer readable medium of claim 8 further comprising storing configuration data for mapping messages received between local network ports and ports on the cloud computer system, wherein first configuration data stored on one of either the first or second software component comprises at least service name and port, and wherein second configuration data stored on the other one of the first or second software component comprises at least service name, network address, and port.

* * * * *